United States Patent [19]

Salomonsson

[11] Patent Number: 4,563,928
[45] Date of Patent: * Jan. 14, 1986

[54] BLADE GUIDE FOR SAW BLADES

[76] Inventor: Krister Salomonsson, Lästad Säteri, S-342 00 Alvesta, Sweden

[*] Notice: The portion of the term of this patent subsequent to Aug. 2, 2001 has been disclaimed.

[21] Appl. No.: 634,643

[22] Filed: Jun. 26, 1984

Related U.S. Application Data

[63] Continuation-in-part of Ser. No. 366,448, Apr. 7, 1982, Pat. No. 4,466,323.

[30] Foreign Application Priority Data

Apr. 22, 1981 [SE] Sweden .................................. 8102557

[51] Int. Cl.⁴ .............................................. B27B 11/02
[52] U.S. Cl. ........................................ 83/821; 83/820; 83/171
[58] Field of Search ..................... 83/820–828, 83/171, 835, 829; 308/36, DIG. 8

[56] References Cited

U.S. PATENT DOCUMENTS

| | | | |
|---|---|---|---|
| 4,309,474 | 1/1982 | Hodes et al. | 308/DIG. 8 |
| 4,466,323 | 8/1984 | Salomonsson | 83/821 |
| 4,474,861 | 10/1984 | Ecer | 308/DIG. 8 |

Primary Examiner—James M. Meister
Assistant Examiner—John L. Knoble
Attorney, Agent, or Firm—Karl W. Flocks; Sheridan Neimark; A. Fred Starobin

[57] ABSTRACT

A blade guide for saw blades consists of a number of small cemented carbide plates which are moulded at intervals onto a base plate of steel or the like by means of a metal, such as brass or bronze, or with a plastic material, which is considerably softer than the carbide in the plates and presents a smooth surface of carbide plates in the moulding material to the surface of the saw blades.

6 Claims, 4 Drawing Figures

U.S. Patent Jan. 14, 1986 4,563,928
*FIG. 1.* *FIG. 2A.* *FIG. 2B.*
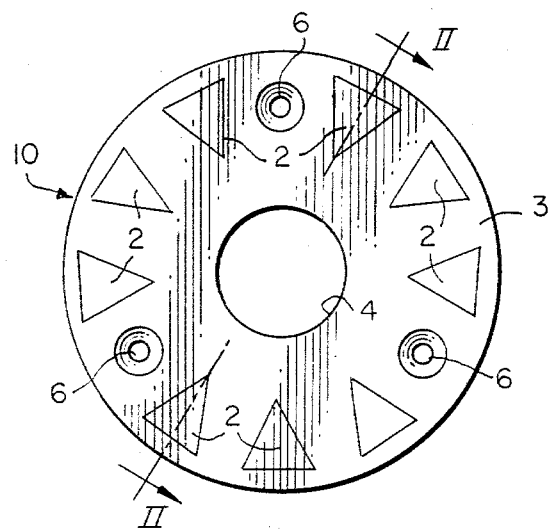
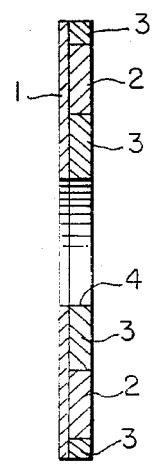
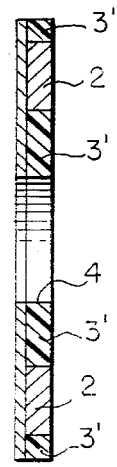
*FIG. 3.*
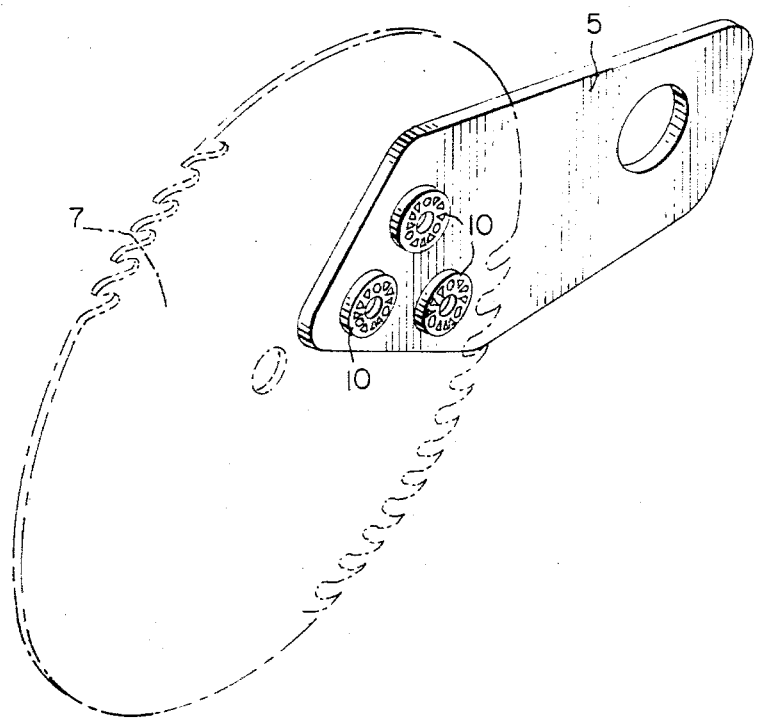

BLADE GUIDE FOR SAW BLADES

BACKGROUND OF THE INVENTION

This is a continuation-in-part application of parent co-pending application Ser. No. 366,448, filed Apr. 7, 1982, now U.S. Pat. No. 4,466,323.

The present invention relates to a blade guide for saw blades, which is characterized by comprising a number of small cemented carbide plates which are moulded at intervals onto a base plate of steel or the like by means of a metal, such as brass or bronze, which is considerably softer than the carbide in the plates. Carbide has proved to be an excellent material for blade guides since it causes even less friction than does fiber material. Up to now, however, it has not been possible to use carbide in blade guides because the large carbide plates in the guides have exploded due to the heat. To provide adequate guiding, the plates must be of a certain minimum size substantially greater than a square inch, but it has now been found that if the area of the carbide plate exceeds about 0.8 inch, far less than necessary for providing adequate guiding, the heat build-up is too great and the plate explodes.

SUMMARY OF THE INVENTION

It is an object of the invention to overcome defects in the prior art, such as indicated above.

It is another object of the invention to provide for improved saw blade guidance.

It is still another object of the invention to produce saw blade guides using a plurality of carbide plates which are so mounted to avoid overheating and the deleterious effects from such overheating.

Accordingly, a plurality of small carbide plates are mounted on a suitable, e.g. steel, base plate so as to avoid such overheating from friction with the saw blade by mounting the carbide plates within a softer metal or a plastic supporting matrix.

Also it is a further object of the invention to prevent the overheating by preventing the build-up of sawdust on the saw blade guides. To prevent such build-up of sawdust, the surface of the saw blade guide should be smooth preventing lodging of sawdust between carbide plate edges and the softer metal or plastic in which the carbide plates are moulded.

BRIEF DESCRIPTION OF THE DRAWINGS

The invention will be described more fully below by way of example, an embodiment of the blade guide and in which:

FIG. 1 is a side view of the blade guide;

FIGS. 2A and 2B are cross-sectional views of the guide on line II—II in FIG. 1; and FIG. 3 is a partial perspective view showing three blade guides on a support which coacts with a saw blade.

DESCRIPTION OF THE PREFERRED EMBODIMENT

Referring to FIGS. 1, 2A and 2B, a saw blade guide 10 is formed with a base plate of steel 1 or the like on which a number of small cemented carbide plates 2 are mounted at intervals. More exactly, the carbide plates 2 are moulded within a supporting matrix onto the base plate 1 by means of a metal 3 or plastic 3' which is considerably softer than the carbide in the plates 2, such metal 3 suitably consisting of brass or bronze. In order that the carbide plates 2 should be well fixed to the base plate 1 in the metal 3 or plastic 3' the carbide plates are soldered, e.g. by brass, copper or silver, to the base plate or held by some adhesive means, e.g. epoxy resin, thereto, or otherwise physically mounted in a secure way.

The base plate 1 is preferably round and the carbide plates 2 are disposed along the periphery of the base plate 1 as shown in FIG. 1. The base plate 1 is provided with a center hole 4 serving as a water cooling channel. Such water cooling is critical because of the high heat generated by friction with a saw blade 7.

Also to prevent overheating, the saw blade guides 10 are made with the carbide plates 2 and the metal 3 or plastic 3' in which they are moulded presenting a smooth surface to saw blade 7. This smooth surface is substantially unbroken in its smoothness between the edges of carbide plates 2 and surrounding moulded metal 3 or plastic 3', i.e. they are at the same surface level. In this manner no sawdust is retained by cracks or uneven surface which sawdust would contribute to such undesirable overheating with the inevitable ultimate explosion of plates 2. Also it is important that the exposed face of the carbide plates 2 turned outward toward the saw blade 7 lie on a level with the outwardly turned softer metal 3 or plastic 3' so that no shape corners or edges come into contact with saw blade 7 as this could cause damage to the saw blade 7.

Saw blade guides 10 are intended to be mounted on a support 5. For this purpose the base plate 1 is provided, between groups of carbide plates 2, with holes 6 for screws or the like for attachment of the base plate 1 to the support 5. According to FIG. 3, the support 5 is provided with three blade guides 10. One support 5 with blade guides 10 is to be provided on each side of the saw blade 7 shown in dashed outline with only one of the supports 5 in FIG. 3. In this figure, for purposes of clarity, the side of support 5 shown is the side wherein the guides 10 are held in position to guide sawblade 7 shown only in dashed outline overlying support 5. A second support 5 would also be used on the opposite side of sawblade 7. The surfaces of guides 10 protrude from the side of support 5 so as to contact and guide blade 7.

In the preferred embodiment of the blade guide, the base plate 6 has a diameter of 70 mm and the center hole 4 has a diameter of 20 mm. The carbide plates 2 are in the form of equilateral triangles, each side being 15 mm and the thickness being 3 mm. The blade guide may, of course, be varied within relatively wide limits and the carbide plates 2 may be, for instance, rectangular, square or round. Such plates are limited as to their maximum size with a preferred maximum of no more than approximately one inch diameter for a round plate, i.e. about 0.8 in.$^2$, since larger areas of carbide plates tend to shatter.

It should be understood that the cross-section of the carbide inserts may vary from that shown in FIGS. 2A and 2B; for example, the cross-sectional shape may be frustro-conical as in parent application Ser. No. 366,448, or any other cross section may be provided. It should also be understood that the spacing of the carbide inserts within the supporting matrix 3 or 3' is not especially critical, e.g. the carbide inserts 2 may be closely spaced so long as they are insured a good supply of cooling water, with only a relatively small area of matrix 3 or 3' therebetween; or, preferably, the matrix material may comprise at least 30% of the area of the blade guide 10 and most preferably at least 50% of the surface area of the blade guide 10. In any event, the total area of carbide surface must be sufficient to provide adequate guide support for the sawblade.

It is to be understood that the invention is not limited to the embodiments disclosed above which are offered illustratively, and that modifications may be made without departing from the invention.

What is claimed is:

1. A blade guide for saw blades comprising
   a base plate,
   a plurality of carbide plates attached to said base plate at spaced intervals,
   a supporting matrix of material softer than said carbide plates embedding said carbide plates therein with the side of said carbide plates facing the saw blades being free of said material of said supporting matrix,
   a surface facing the saw blades including said carbide plates and said material of said supporting matrix being substantially smooth with said carbide plates at the same level as said material of said supporting matrix.
2. The blade guide of claim 1 further characterized by said base plate being of steel.
3. The blade guide of claim 1 further characterized by said material of said supporting matrix being of brass.
4. The blade guide of claim 1 further characterized by said material of said supporting matrix being of bronze.
5. The blade guide of claim 1 further characterized by said material of said supporting matrix being of a plastic material.
6. A blade guide for saw blades, comprising a number of small cemented carbide plates (2) which are moulded at intervals onto a base plate (1) of steel by means of metal (3) which is considerably softer than the carbide in the plates (2), the cemented carbide plates (2) being so embedded in the softer metal (3) that only the outsides of the plates (2) facing the saw blade (7) are free from the softer metal (3).

* * * * *